US012372687B2

(12) United States Patent
Vu et al.

(10) Patent No.: US 12,372,687 B2
(45) Date of Patent: Jul. 29, 2025

(54) PHOTOCHROMIC POLYURETHANE LAMINATE

(71) Applicant: HOYA Optical Labs Of America, Inc., Lewisville, TX (US)

(72) Inventors: Hannah Vu, New Brighton, MN (US); Hideyo Sugimura, North Oaks, MN (US); Ping Fan, Ramsey, MN (US); Hao Vu, New Brighton, MN (US)

(73) Assignee: HOYA Optical Labs Of America, Inc., Lewisville, TX (US)

( * ) Notice: Subject to any disclaimer, the term of this patent is extended or adjusted under 35 U.S.C. 154(b) by 64 days.

(21) Appl. No.: 18/364,412

(22) Filed: Aug. 2, 2023

(65) Prior Publication Data

US 2023/0375751 A1 Nov. 23, 2023

Related U.S. Application Data

(60) Division of application No. 17/516,619, filed on Nov. 1, 2021, now Pat. No. 11,754,752, which is a division of application No. 16/410,657, filed on May 13, 2019, now Pat. No. 11,181,666, which is a division of application No. 15/838,037, filed on Dec. 11, 2017, now Pat. No. 10,330,828, which is a continuation of application No. 14/864,748, filed on Sep. 24, 2015, (Continued)

(51) Int. Cl.

| | |
|---|---|
| ***G02B 5/23*** | (2006.01) |
| ***B32B 27/40*** | (2006.01) |
| ***C08G 2/10*** | (2006.01) |
| ***C08G 18/10*** | (2006.01) |
| ***C08G 18/32*** | (2006.01) |
| ***C08G 18/42*** | (2006.01) |
| ***C08G 18/75*** | (2006.01) |
| ***G02B 1/04*** | (2006.01) |
| ***G02C 7/10*** | (2006.01) |

(52) U.S. Cl.

CPC .............. *G02B 1/041* (2013.01); *B32B 27/40* (2013.01); *C08G 2/10* (2013.01); *C08G 18/10* (2013.01); *C08G 18/3206* (2013.01); *C08G 18/4277* (2013.01); *C08G 18/758* (2013.01); *G02B 5/23* (2013.01); *G02C 7/102* (2013.01); *Y10T 428/31551* (2015.04)

(58) Field of Classification Search

CPC .......... G02B 1/041; G02B 5/23; B32B 27/40; C08G 2/10; C08G 18/10; C08G 18/3206; C08G 18/4277; C08G 18/758; G02C 7/102; Y10T 428/31551; B29L 2011/0016

See application file for complete search history.

(56) References Cited

U.S. PATENT DOCUMENTS

| | | | |
|---|---|---|---|
| 6,287,698 | B1 | 9/2001 | Zhu et al. |
| 2004/0126587 | A1 | 7/2004 | Maki et al. |

(Continued)

*Primary Examiner* — Scott W Dodds

(74) *Attorney, Agent, or Firm* — Inskeep IP Group, Inc.

(57) ABSTRACT

A photochromic polyurethane laminate wherein the photochromic polyurethane layer of the laminate has been crosslinked with an isocyanate-active prepolymer using a crosslinking agent. The crosslinking agent is formulated to have at least three functional groups that are reactive with functional groups of the polyurethane or of the isocyanate-active prepolymer. A method of making the photochromic polyurethane laminate includes steps of causing the crosslinking.

19 Claims, 6 Drawing Sheets

Separating Direction

Separated part of test strip

Unseparated part

Separating Direction

Related U.S. Application Data now Pat. No. 9,869,801, which is a division of application No. 13/563,236, filed on Jul. 31, 2012, now Pat. No. 9,163,108, which is a continuation-in-part of application No. 12/763,103, filed on Apr. 19, 2010, now abandoned.

(60) Provisional application No. 61/170,473, filed on Apr. 17, 2009.

(56) References Cited

U.S. PATENT DOCUMENTS

2005/0196618 A1 9/2005 Knox
2005/0233153 A1 * 10/2005 Qin ........................ B32B 27/08
428/423.1

* cited by examiner

| | Multifunctional alcohols as crosslink agent | | | | | | | | | | | Multifunc-tional isocyanates | Different resin sheets | |
|---|---|---|---|---|---|---|---|---|---|---|---|---|---|---|
| **Example #** | **1** | 2 | 3 | 4 | 5 | 6 | 7 | 8 | 9 | **10** | **Comparative 11** | **12** | **13** | **14** |
| **PU from Synthesis Example 1, g (1)** | 1893.2 | 1893.2 | 1575.4 | 1579.9 | 1511.8 | 1648.0 | 1670.734 | 1634.4 | 1526.3 | 1670.7 | 342.7 | 3.9 | 1893.2 | 18.9 |
| **Isocyanate prepolymer from Synthesis Example 2, g (2)** | 485.8 | 513.0 | 494.9 | 494.9 | 517.6 | 481.2 | 517.6 | 490.3 | 490.3 | 476.7 | 342.7 | 3.9 | 513.0 | 5.1 |
| **Crosslinking agent name (3)** | TMP | TMP | TMP | glycerin | TMP | glycerin | glycerin | TMP | glycerin | Di-TMP | No | Desmodur N75 BA/X | Di-TMP | Di-TMP |
| **Crosslinking agent wt, g (4)** | 1.05 | 1.54 | 2.9 | 1.9 | 3.7 | 1.5 | 2.5 | 2.5 | 1.7 | 7.4 | 0 | 0.22 | 1.54 | 0.15 |
| **Photochromic dye, g (5)** | 22.7 | 22.7 | 22.7 | 22.7 | 22.9 | 22.8 | 22.9 | 22.9 | 23.1 | 22.9 | 18.7 | 0.47 | 22.7 | 0.22 |
| **Light Stabilizer #1, g (6)** | 4.54 | 4.54 | 9.1 | 9.1 | 9.2 | 9.1 | 9.2 | 9.2 | 9.2 | 9.2 | 4.5 | 0.26 | 4.54 | 0.45 |
| **Light Stabilizer #2, g (7)** | 4.54 | 4.54 | 9.1 | 9.1 | 9.2 | 9.1 | 9.2 | 9.2 | 9.2 | 9.2 | 4.5 | 0.26 | 4.54 | 0.45 |
| **Antioxidant, g (8)** | 4.54 | 4.54 | 9.1 | 9.1 | 9.2 | 9.1 | 9.2 | 9.2 | 9.2 | 9.2 | 4.5 | 0.26 | 4.54 | 0.45 |
| **Resin sheets (9)** | polycarbonate | polycarbonate | polycarbonate | polycarbon-ate | polycarbon-ate | polycarbon-ate | polycarbon-ate | polycarbon-ate | polycarbon-ate | polycarbon-ate | polycarbonate | polycarbonate | PMMA | Cellulose Triacetate |

FIGURE 1

| Abbrevations | Chemical names | Mw | Functional groups/ mol |
|---|---|---|---|
| TMP | Trimethyol propane | 134.18 | 3 |
| Di-TMP | Di (trimethyol propane) | 250.33 | 4 |
| Glycerin | Glycerin | 92.09 | 3 |

FIGURE 3

| Example # | 1 | 2 | 3 | 4 | 5 | 6 | 7 | 8 | 9 | 10 | Comparative 11 | 12 | 13 | 14 |
|---|---|---|---|---|---|---|---|---|---|---|---|---|---|---|
| Room Temperature T-Peel strength (kg/cm) | 4.89 | 4.83 | 4.93 | 4.96 | 5.22 | couldn't peel, sample broke | 5.07 | 4.61 | 4.85 | 4.25 | 3.9 | 6.54 | 121 | 2.2 |
| High Temperature T-Peel separation, mm in 10 min (130C, 230g) | 10.3 | 0 | 0 | 0 | 0 | 0 | 0 | 0 | 0 | 0 | 700 | 0 | 1.0 for 113C, 100g, 10min | 1.0 for 113C, 100g, 10min |
| High Temperature T-Peel separation after 24hrs at 70C ~95% RH, mm in 10 min | 7.3 | 0 | 0 | 12 | 0 | 0 | 0 | 0 | 0 | 0 | 1000 | 62 | 0 for 113C, 100g, 10min | n/a |
| Solvent resistance | mostly dissolved | mostly dissolved | partial dissolved | partial dissolved | partial dissolved | partial dissolved | partial dissolved | little dissolved, swell | little dissolved, swell | little dissolved, swell | fully dissolved | partial dissolved | little dissolved, swell | little dissolved, swell |
| Observed Bleeding | Light | light | very light | very light | No | No | No | No | No | No | very heavy | light | n/a** | n/a** |
| Mw by GPC | 685,200 | 1,820,000 | Not measure-able* | Not measure-able* | Not measure-able* | Not measure-able* | Not measure-able* | Not measure-able* | Not measure-able* | Not measure-able* | 453,202 | Not measureable* | Not measure-able* | Not measure-able* |

*The resulting polyurethane had a molecular weight which prevented dissolving of the polyurethane in the solvent.

** Bleeding test not applicable for these resin sheets since they represent a laminate useful for a cast lens process.

FIGURE 2

| | Multifunctional alcohols as X-link agent | | | | | |
|---|---|---|---|---|---|---|
| | | | | | | |
| **Examples** | **15** | **16** | **17** | **18** | **19** | **20** |
| PU from Synthesis Example 1 , g (1) | 74.4 | 59.5 | 47.2 | | | |
| PU from Synthesis Example 3, g (2) | | | | 67.6 | 55.3 | 67.7 |
| Isocyanate prepolymer from Synthesis Example 2, g (3) | 20.10 | 24.1 | 19.1 | | | |
| Isocyanate prepolymer from Synthesis Example 4, g (4) | | | | 14.6 | 17.9 | 14.6 |
| THF,g (5) | 14.3 | 25.1 | 28.5 | 6.3 | 15.3 | 16.8 |
| Di-TMP 2% solution in THF, g (6) | 5.4 | 5.4 | 3.6 | 5.38 | 5.38 | 3.7 |
| Photochromic dye, g (7) | 0.78 | 0.78 | 0.78 | 0.78 | 0.78 | 0.78 |
| Light Stabilizer 1, g (8) | 0.45 | 0.45 | 0.45 | 0.34 | 0.34 | 0.34 |
| Light Stabilizer 2, g (9) | 0 | 0 | 0 | 0 | 0 | 0 |
| Antioxidant, g (10) | 0.05 | 0.05 | 0.05 | 0.17 | 0.17 | 0.17 |
| Dry cast thickness (11) | 2mil | 2mil | 1.5mil | 1.65mil | 1.65mil | 1.65mil |

FIGURE 4

| Examples | 15 | 16 | 17 | 18 | 19 | 20 |
|---|---|---|---|---|---|---|
| Room Temperature T-Peel strength | 6.82 | 6.42 | 6.1 | 5.5 | 5.88 | 5.15 |
| High Temperature T-Peel separation, mm in 10 min (130C, 230g) | 210 | 0 | 0 | 0 | 0 | 0 |
| High Temperature T-Peel separation after 24hrs at 70C ~95% RH, mm in 10 min | 65.2 | 32.3 | 21.7 | 0 | 2.3 | 0 |
| Solvent Resistance | not dissolved | not dissolved | not dissolved | not dissolved | not dissolved | not dissolved |
| Observed Bleeding | No | No | No | No | No | No |
| MW by GPC | Not measurable | Not measurable | Not measurable | Not measurable | Not measurable | Not measurable |

FIGURE 5

PHOTOCHROMIC POLYURETHANE LAMINATE

RELATED APPLICATIONS

This application is a divisional of and claims priority to U.S. patent application Ser. No. 17/516,619 filed Nov. 1, 2021 entitled Photochromic Polyurethane Laminate, which is a divisional of and claims priority to U.S. patent application Ser. No. 16/410,657 filed May 13, 2019 entitled Photochromic Polyurethane Laminate (now U.S. Pat. No. 11,181,666 issued Nov. 23, 2021), which is a divisional of U.S. patent application Ser. No. 15/838,037 filed Dec. 11, 2017 entitled Photochromic Polyurethane Laminate (now U.S. Pat. No. 10,330,828 issued Jun. 25, 2019), which is a continuation of and claims priority to U.S. patent application Ser. No. 14/864,748 filed Sep. 24, 2015 entitled Photochromic Polyurethane Laminate (now U.S. Pat. No. 9,869,801 issued Jan. 16, 2018), which is a divisional of and claims priority to U.S. patent application Ser. No. 13/563,236 filed Jul. 31, 2012 entitled Photochromic Polyurethane Laminate (now U.S. Pat. No. 9,163,108 issued Oct. 20, 2015), which is a continuation-in-part of U.S. patent application Ser. No. 12/763,103 filed Apr. 19, 2010 entitled Photochromic Polyurethane Laminate; which claims priority to U.S. Provisional Application Ser. No. 61/170,473 filed Apr. 17, 2009 entitled Photochromic Polyurethane Laminate With Improved Adhesion And Strength; all of which are hereby incorporated herein by reference in their entireties.

FIELD OF THE INVENTION

The present invention relates generally to a photochromic laminate that can be applied to polymeric surfaces or can be used by itself as a photochromic element. The present invention also relates to a photochromic laminate that is capable of withstanding high temperatures and can be incorporated into plastic lenses by means of injection molding or casting. The present invention further relates to a photochromic laminate that is excellent in both control of thickness and surface smoothness of the photochromic layer, and thereof exhibits uniform darkness at the activated state.

DESCRIPTION OF THE RELATED ART

Photochromic articles, particularly photochromic plastic materials for optical applications, have been the subject of considerable attention. In particular, photochromic ophthalmic organic glass lenses (e.g., injection molded polycarbonate lenses or CR39 cast lenses) have been commercially desirable because of the weight advantage and impact resistance they offer over glass lenses. Moreover, photochromic transparencies, e.g., photochromic window panes for vehicles such as cars, boats and airplanes, have been of interest because of the potential safety features that such transparencies offer.

The use of polycarbonate ophthalmic lenses, particularly in the United States, is widespread. The demand for sunglasses that are impact resistant has increased as a result of extensive outdoor activity. Materials such as polycarbonate, however, have not historically been considered optimal ophthalmic sunglass lenses with photochromic dyes due to slow activation rates, slow fading (bleaching) rate, and low activation intensity.

Nonetheless, there are several existing methods to incorporate photochromic properties into lenses made from materials such as polycarbonate. One method involves applying to the surface of a lens a coating containing dissolved photochromic compounds. For example, Japanese Patent Application 3-269507 discloses applying a thermoset polyurethane coating containing dissolved photochromic compounds on the surface of a lens. U.S. Pat. No. 6,150,430 similarly discloses a photochromic polyurethane coating for lenses. The content of each of these prior art references is incorporated by reference.

Another method involves coating a lens with an imbibing process. A process described in U.K. Pat. No. 2,174,711 or U.S. Pat. No. 4,968,454, both of which are incorporated by reference herein, is used to imbibe a solution containing photochromic compounds into the base coating material. The most commonly used base material is polyurethane.

The two methods described above, however, which involve coating or imbibing the lens after it is molded, have significant shortcomings. For example, typically a coating of about 25 μm or more is needed in order for a sufficient quantity of photochromic compounds to become incorporated into the base of the lens and thereby provide the desired light blocking quality when the compounds are activated. This relatively thick coating is not suited for application on the surface of a segmented, multi-focal lens because an unacceptable segment line and coating thickness nonuniformity around the segment line are produced. The desired surface smoothness is also affected.

Turning to lenses made from injection molded techniques, lenses made of plastic materials such as polycarbonate can be produced by an injection molding process that uses an insert placed in the mold prior to the injection of the molten plastic material (insert-injection molding). The insert can be the means by which photochromic properties are incorporated into the lenses. Insert injection molding is a process whereby the molten plastic resin is injection molded onto an insert having, e.g., a photochromic property, that has been placed in the mold cavity. An example of this process is disclosed in commonly assigned U.S. Pat. No. 6,328,446 (which is hereby incorporated by reference in its entirety), whereby a photochromic laminate is first placed inside a mold cavity. Molten polycarbonate lens material is next injected into the cavity and fused to the back of the photochromic laminate. This produces a photochromic polycarbonate lens. Because the photochromic function is provided by a thin photochromic layer in the laminate, it is possible to then finish-grind the photochromic polycarbonate lenses with any kind of surface curvature without damaging or degrading the photochromic properties of the lens.

Photochromic lenses can also be made by the cast process as described in US Patent Publication 2007/0122626, the entire contents of which is incorporated by reference. The cast molding process includes placing the photochromic film in a cast mold, then introducing the cast monomer into the mold and then curing the monomer in the mold into lenses either by heat or by radiation.

Resin laminates with photochromic properties that could be considered for use in the above-mentioned insert-injection molding technique or the cast molding process have been disclosed in many patents and publications. Examples include Japanese Patent Applications 61-276882, 63-178193, 4-358145, and 9-001716; U.S. Pat. No. 4,889, 413; U.S. Patent Publication No. 2002-0197484; and WO 02/093235 (each of which is incorporated by reference herein). The most commonly used structure is a photochromic polyurethane host layer bonded between two transparent resin sheets. Although the use of polyurethane as a photochromic host material is well known, photochromic polyurethane laminates designed especially for making photochromic polycarbonate lenses through, for example, the insert-injection molding method are unique.

Problems associated with conventional insert injection molding techniques in the manufacture of photochromic lens using prior art photochromic polyurethane laminates include polyurethane bleeding and poor replication of lens segment lines. "Bleeding" occurs from the deformation of the polyurethane layer during injection molding processing. In particular, bleeding occurs when the polyurethane layer melts and escapes from its position between the two transparent sheets of the laminate during the high temperature and high-pressure injection molding process. The inventors are of the view that bleeding most frequently results from an excess amount of polyurethane and from using too soft a polyurethane material. The inventors are also of the view that poor replication of segment lines occurs when the layer of polyurethane is too thick and movement of the laminate occurs as pressure from the mold is applied.

In attempts to address at least the bleeding problem, it is preferred to have the polyurethane cross-linked thus making a harder and high temperature resistant polyurethane material. However, cross-linked polyurethane, once made, is difficult to laminate between transparent resin sheets and arrive at a suitable photochromic laminate. For example, a cross-linked polyurethane, once made, is not soluble in a solvent and thus cannot be laminated between transparent resin sheets using the casting method. A cross-linked polyurethane also neither melts nor softens at temperature ranges necessary for making a laminate with transparent resin sheets through the extrusion process. One method that has been considered for incorporating cross-linked polyurethane into a laminate is to start with a liquid polyurethane system such as the one described in U.S. Patent Publication No. 2002-0197484 (incorporated by reference). To make the laminate efficiently, a web coat-laminate line such as the one described in Japan Patent Laid Open 2002-196103 (incorporated by reference), might be used. The coating equipment is capable of coating a uniform layer of liquid polyurethane mixture.

However, this layer will only be partially solidified (or cured) at the moment of in-line lamination. Consequently, any surface defects in the resin sheet and/or the lamination rollers are easily transferred to the soft polyurethane layer during lamination. The most often seen defects in the polyurethane layer include thickness un-evenness across the web and thin spots due to uneven pressure at lamination or improper handling. In order to have the polyurethane layer firm enough to withstand the necessary pressure during lamination and avoid these defects, it needs to first be cured for a certain amount of time. Curing, however, slows down the processing or renders the web coating-laminating approach impossible.

SUMMARY OF THE INVENTION

In view of the above, a need exists to overcome the problems and shortcomings associated with existing polyurethane laminates having photochromic properties and methods of making such laminates.

The concepts disclosed in U.S. Patent Publication No. 2005/0233153 (the "'153 Publication"), the entire contents of which are incorporated herein, attempt to address at least some of these needs. However, the need exists to further overcome these problems and shortcomings even beyond the teachings of the '153 Publication.

For example, the present application discloses the concept of introducing a network structure into the molecular make up of a photochromic polyurethane layer by adding a crosslinking agent having three or more functional groups into the formulation. Said functional groups are preferably either active hydroxyl groups or NCO groups. This creates a network structure by the occurrence of a crosslinking reaction during the curing stage of the polyurethane thereby improving the properties of the layer.

Some of the resulting improved properties over at least the teachings of the '153 Publication include increased mechanical strength, improved chemical resistance, improved adhesion of the polyurethane layer to the first and second transparent resin sheet; improved cohesion within photochromic polyurethane layer; improved heat resistance of the laminate, improved humidity resistance of the laminate, and improved bleeding resistance of the laminate during the molding process.

BRIEF DESCRIPTION OF THE DRAWINGS

FIG. 1 is a table setting forth the formulation of various specific embodiments of a laminate in accordance with the present inventive concepts;

FIG. 2 is a table setting forth physical properties of the various specific embodiments of FIG. 1;

FIG. 3 is a table setting forth representative embodiments of crosslinking agents used in the various specific embodiments of FIG. 1.

FIG. 4 is a table setting forth the formulation of various specific embodiments of a laminate in accordance with the present inventive concepts.

FIG. 5 is a table setting forth physical properties of the various specific embodiments of FIG. 4.

DESCRIPTION OF PREFERRED EMBODIMENTS

Figure 6:
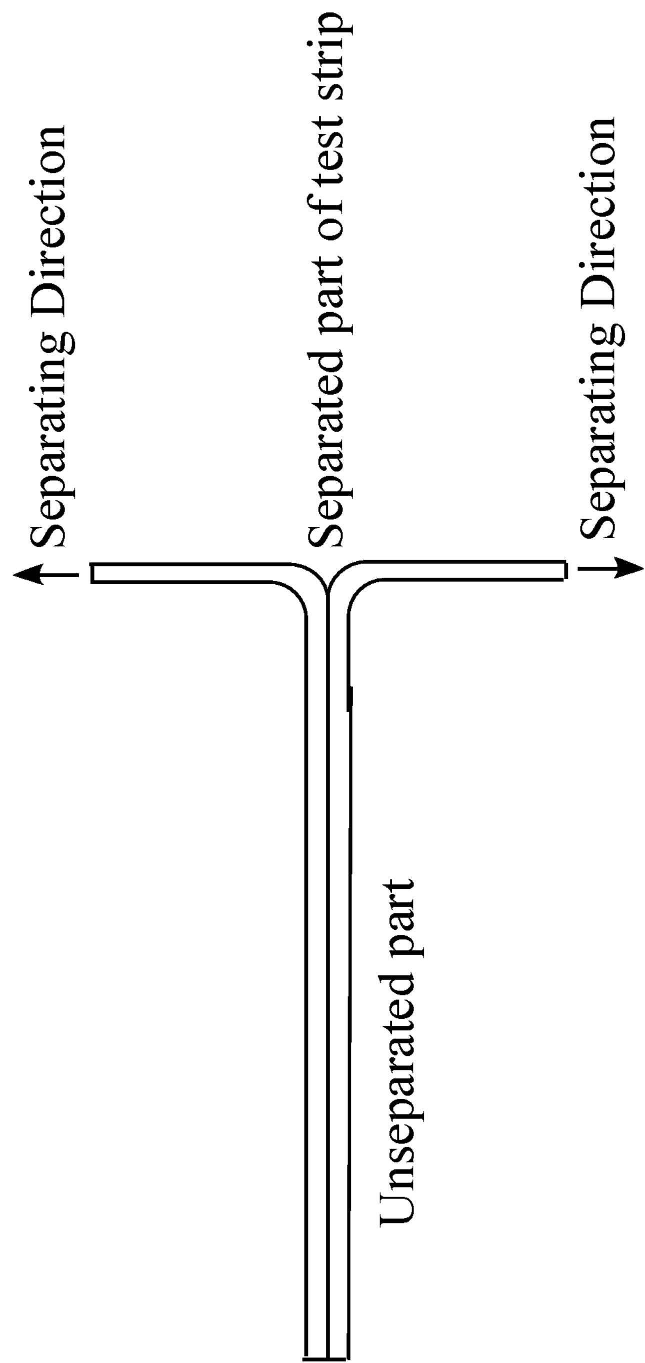
FIG. 6 is a schematic description of a room temperature test configuration for measuring peel strength of embodiments of the present invention.

A preferred embodiment of the present invention includes a photochromic polyurethane laminate that includes a first resin layer, a second resin layer and a polyurethane layer having photochromic properties interposed between the first and second resin layer. The polyurethane layer is formulated from a polyurethane that has been crosslinked with an isoycanate-active prepolymer via a crosslinking agent. In a preferred embodiment, the crosslinking agent has molecules that have at least three functional groups that are reactive with either a functional group of the polyurethane or a functional group of the isocyanate-active prepolymer. In other words, the at least three functional groups are reactive with a functional group of at least one of the polyurethane and isocyanate-active prepolymers. A crosslinked photochromic polyurethane laminate of this type leads to a laminate that has improved mechanical and material properties thus providing a laminate that is more versatile and robust for use in manufacturing photochromic articles such as injection molded photochromic lenses and/or cast photochromic lenses.

In one preferred embodiment the crosslinking agent is a multifunctional alcohol where at least three functional groups react with the isocyanate groups of the isocyanate prepolymer. In another preferred embodiment, the crosslinking agent is a multifunctional isocyanate, isocyanate oligomers or isocyanate prepolymers where the functional groups react with the hydroxyl groups of the polyurethane.

Another aspect of the present invention is the method of making a photochromic polyurethane laminate. In one preferred embodiment, the process includes providing a polyurethane, dissolving the polyurethane into a solution; adding an isocyanate prepolymer into the solution, introducing a crosslinking agent into the solution, wherein the crosslinking solution has at least three functional groups. At least one photochromic dye is then introduced into the solution. The functional groups of the crosslinking agent react with a functional group of at least one of the polyurethane and isocyanate prepolymer so as to form a crosslinked photochromic polyurethane layer. This layer is then sandwiched between a first and second resin sheet.

Specific preferred embodiments of the aforementioned inventive concepts are discussed below.

Synthesis Example 1: Synthesis of Thermoplastic Polyurethane

Step 1: Synthesis of Isocyanate Prepolymer.

In a 3-necked flask equipped with an overhead stirrer, thermocouple, and a vacuum adapter, 1226.0 g (9.27 equivalents) of 4,4'-dicyclohexylmethanediisocyanate (H12MDI, available from Bayer as Desmodur W) was charged into the reactor and stirred at ambient temperature. 2000 g (4.02 equivalents) of a polycaprolactone diol having an OH number of 112 mg KOH/g and a number average molecular weight of about 1000 g/mole (available from Dow Chemical as Tone™ 2221) was preheated in an oven to 80° C. and added to the reactor. The mixture was allowed to stir for about 15 minutes, before adding 16 g of dibutyltin dilaurate catalyst (available from Air Products as T-12). The reaction flask was evacuated (<0.1 mm HG) and held at 90° C. for 6 hours. An aliquot of the prepolymer was withdrawn and titrated for isocyanate content using standard n-butyl amine titration. The isocyanate content was found to be 6.75% (theory; 6.83%). The molecular weight is in the range of 5000-15,000

Step 2: Synthesis of Thermoplastic Polyurethane

A thermoplastic polyurethane having a theoretical NCO index of 95 was prepared as follows. The isocyanate prepolymer (1854.4 g) prepared in step 1 was heated in vacuum oven (<0.1 mm HG) with stirring to 80° C. and 1,4-butanediol (145.6 g) as the chain extender and 6 g of dibutyltin dilaurate catalyst were combined with the prepolymer while stirring. The mixture was stirred for 30 seconds and subsequently poured into a Teflon lined tray. The tray containing the casting was cured in an oven at 85° C. for 24 hours. The thermoplastic polyurethane obtained had a molecular weight of 100,000 measured by Viscotek GPC.

Synthesis Example 2: Synthesis of Isocyanate-Active Prepolymer

In a 3-necked flask equipped with an overhead stirrer, thermocouple, and a vacuum adapter, 1210 g (9.15 equivalents) of 4,4'-dicyclohexylmethanediisocyanate (H12MDI, available from Bayer as Desmodur W) was charged into the reactor and stirred at ambient temperature. 3000 g (6.03 equivalents) of a polycaprolactone diol having an OH number of 112 mg KOH/g and a number average molecular weight of about 1000 g/mole (available from Dow Chemical as Tone™ 2221) was preheated in an oven to 80° C. and added to the reactor. The mixture was allowed to stir for about 15 minutes, before adding 12 g of dibutyltin dilaurate catalyst (available from Air Products as T-12). The reaction flask was evacuated (<0.1 mm HG) and held at 90° C. for 6 hours. An aliquot of the prepolymer was withdrawn and titrated for isocyanate content using standard n-butyl amine titration. The isocyanate content was found to be 3.07% (theory; 3.10%). The polyurethane prepolymer had a molecular weight of 6,000 measured by Viscotek GPC.

Synthesis Example 3: Synthesis of Thermoplastic Polyurethane 595.5 g of isocyanate prepolymer prepared in step 1 of synthesis example 1 was heated in vacuum (<0.1 mm HG) with stirring to 80° C. and combined with 48.0 g of 1,4-butane-diol while stirring. The mixture was stirred for 30 seconds and subsequently poured into a Teflon lined tray. The tray containing the casting was cured in an oven at 85° C. for 24 hours. The thermoplastic polyurethane obtained had weight average molecular weight of 75,230 measured by GPC.

Synthesis Example 4: Synthesis of Isocyanate-Active Prepolymer

In a 3-necked flask equipped with an overhead stirrer, thermocouple, and a vacuum adapter, 335 g (2.55 equivalents) of 4,4'-dicyclohexylmethanediisocyanate (available from Bayer as Desmodur W) was charged into the reactor and stirred at ambient temperature. 664.8 g (1.33 equivalents) of a polycaprolactone diol having an OH number of 112 mg KOH/g (available from Dow Chemical as Tone™ 2221) was preheated in an oven to 80° C. and added to the reactor. The mixture was allowed to stir for about 15 minutes, before adding 2.5 g of dibutyltin dilaurate catalyst (available from Air Products as T-12). The reaction flask was evacuated (<0.1 mm HG) and held at 80° C. for 3 hours and cooled down. The resulted product was titrated and resulted in NCO content of 5.10%.

Making Laminates

Examples 1 to 14

A quantity of the thermoplastic polyurethane (TPU) prepared in Synthesis Example 1 was weighed and is identified as row 1 in FIG. 1. A solution containing about 23% solute and 77% THF solution is prepared by dissolving the thermoplastic polyurethane in THF at room temperature. To the solution was further added the quantity of the isocyanate prepolymer prepared in Synthesis Example 2 identified in row 2 of FIG. 1, and crosslinking agent identified in row 3 of FIG. 1 in the quantity as shown in row 4 of FIG. 1. Further details of the crosslinking agent are identified in the table of FIG. 3. Into the mixture were also added the quantity of photochromic dye and additives as shown in rows 5 to 8 of FIG. 1. The mixture was stirred at room temperature for 3 hours and then was cast on an easy release liner (available from CPFilms as T-50) with a draw bar targeting a 38 micrometer dry film thickness. The solvent in the cast film was evaporated at 60° C. for 5 minutes using airflow above the film. The dried film was transfer-laminated between two resin sheets identified in row 9 of FIG. 1 with a bench top roller laminator. After 4 days under ambient temperature (about 70° F.) the laminate was cured at 60° C. for 4 days.

It will be noted that Example No. 11 in FIG. 1 is designated as the "comparative" example. This is because Example 11 reflects a photochromic polyurethane laminate where the polyurethane layer is not crosslinked. As such, Example 11 provides a comparison of the material properties resulting from the present invention and the improvements therein.

Examples 15-20

A quantity of the thermoplastic polyurethane (TPU) prepared in Synthesis Example 1 or Synthesis Example 3 was weighed as shown in row (1) and row (2), respectively, in FIG. 4. A 27% of THF solution is prepared by dissolving the thermoplastic polyurethane in THF at room temperature. To the solution was further added the quantity of the isocyanate prepolymer prepared in Synthesis Example 2 or Synthesis Example 4 as shown in row (3) and row (4), respectively, in FIG. 4. Quantities of 2% Di-TMP solution in THF was added as shown in row (6) in FIG. 4. Into the mixture were also added the quantities of photochromic dye and additives as shown in rows (7) to (10) in FIG. 4. The mixture was stirred at room temperature for 3 hours before cast on an easy release liner (available from CPFilms as T-50) with draw bar targeting a dry film thickness as in row (11) in FIG. 4. The solvent in the cast film was evaporated at 60° C. for 5 minutes with airflow above the film. The dried film was transfer-laminated between two polycarbonate sheets with a bench top roller laminator. After 4 days under ambient, the laminate was cured at 70° C. for 4 days.

Various tests of the examples were then tested for various properties. The tests used to determine those properties are discussed below. The results of those tests are set forth in the table of FIGS. 2 and 5.

Figure 7:
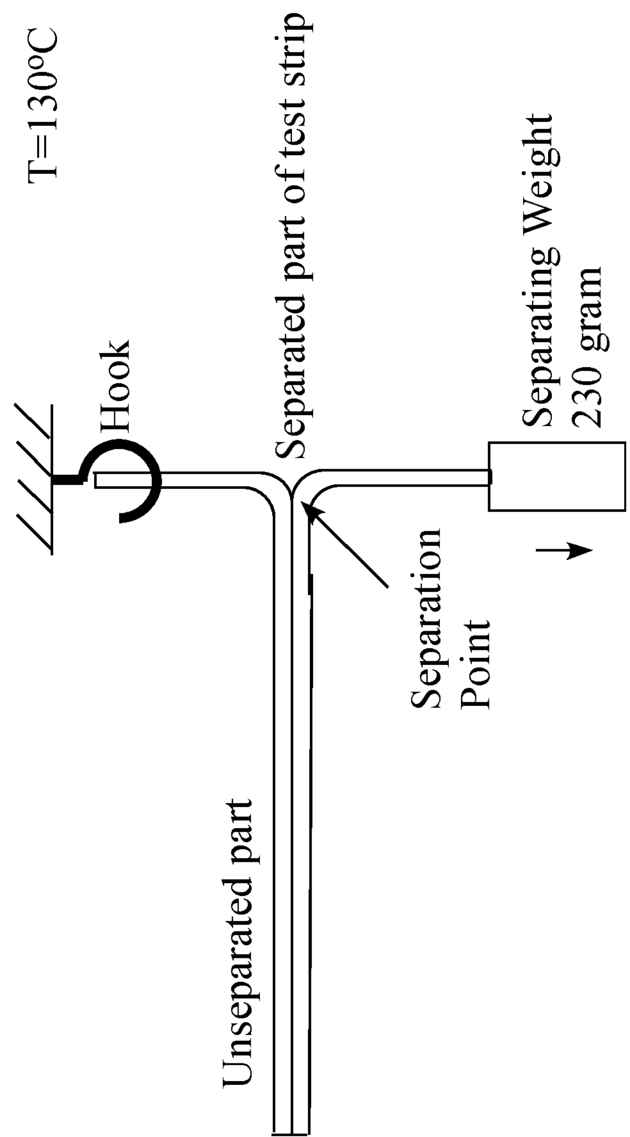
FIG. 7 is a schematic description of a high temperature test configuration for measuring peel strength of embodiments of the present invention.

Test procedures used in obtaining the material property results set forth in the table of FIGS. 2 and 5 are set forth below:

1. Room Temperature T-Peel Strength: 1 cm×7 cm strips of the laminate are punched out of the cast sheet with a hand punching press. T-Peel strength, i.e., the adhesion strength of the laminate was measured on the samples on Instron at speed of 6 in/min at room temperature. In particular, for each strip, the edges of the resin sheet on either side of the photochromic polyurethane layer are pulled away from each other at room temperature at a pre-set rate (e.g., 6 in/min). The resulting measured value is the force per width of the laminate required to separate the two resin sheets at room temperature. A schematic drawing of the Room Temperature T-Peel Separation test is depicted in FIG. 6.
2. High Temperature T-Peel Separation: 1 cm×7 cm strips of the laminate are punched out of the cast sheet with the hand punching press. The oven was set at 130 C. The sample was then hung in an oven, one edge of the top resin sheet of a strip attached to the oven hood and the corresponding edge of the bottom resin sheet of the strip attached to 230 g weight for 10 minutes. The distance separating the top and bottom resin sheets was measured at the end of 10 minutes. If the two resin sheets were separated completely before 10 minutes, then the time to the drop of the weight was recorded. Separation length was then extrapolated for the total 10 minutes of the test. A schematic drawing of the High Temperature T-Peel Separation test is depicted in FIG. 7.
3. Solvent resistance: 3 strips of 1 cm×7 cm of the laminate were placed in an oven at 235 F for 5 minutes. The laminate was then peeled apart such that one of the resin sheets is separated from the other resin sheet and the crosslinked photochromic polyurethane is left deposited on one or both of the resin sheets. The strips were then placed in a TechSpray AK225 solvent for 1 to 2 minutes. The polyurethane was then scraped off each laminate side. The collected polyurethane was then dried in a vacuum oven overnight at 60 C. The dried polyurethane was placed in a 20 ml glass vial with 10 ml THF. The behavior of the polymer was then observed after 3 hours at room temperature to see to what extent the polyurethane was dissolved.
4. Bleeding resistance: The cast sheet of laminate was punched into 86 mm diameter disks. Each disk was placed in a molding cavity. Polycarbonate resin was injected behind the disk to perform insert-injection molding as discussed above. The edge of the disk was then checked for any bleeding of the photochromic layer outside of the disk. In this regard, it is noted from FIG. 1 that Examples 13 and 14 do not contain bleeding resistance data. This is because the transparent resin sheets for Examples 13 and 14 were composed PMMA and Cellulose Triacetate, respectively. These types of materials are more suited for the manufacture of cast photochromic lenses and not injection molded photochromic lenses. Hence, the bleeding test was not performed for Examples 13 and 14.

Crosslinking Agents

The characteristics of crosslinking agents used in connection with the present invention are described below.

Molecules of suitable crosslinking agents for the present invention contain more than 2 functional groups that react with either the hydroxyl group in the thermoplastic polyurethane or the isocyanate group in the isocyanate prepolymer. Preferred embodiments of such crosslinking agents are discussed below.

One preferred embodiment of a crosslinking agent is multifunctional alcohols having not less than 3 alcohol functional groups. The alcohol functional groups react with isocyanate group in the isocyanate prepolymer to form the urethane linkage and hence the three-dimensional polymer molecule structure. Preferred embodiments include, but are not limited to, trimethyolpropane, trimethylolmethane, glycerin, pentaerythritol and di(trimethylolpropane).

Another preferred embodiment is an oligomer with more than two OH functional groups that can react with the isocyanate group in the isocyanate prepolymer. A preferred embodiment includes, but is not limited to, trimethylolpropane propoxylate with average molecule Mw=308 as supplied by Sigma Aldrich.

Another preferred embodiment is a solution that has molecules with total amino and OH groups not less than two wherein these groups react with isocyanate group of the prepolymer. Preferred embodiments include, but are not limited to, N,N-Bis(2-hydroxyethyl)isopropanolamine,N,N,N',N'-Tetrakis(2-Hydroxypropyl)-ethylenediamine.

Another preferred embodiment includes multifunctional isocyanates, isocyanate oligomers and isocyanate prepolymers, each having at least 3 NCO groups that react with the hydroxyl group of the polyurethane. Preferred embodiments include, but are not limited to, Desmodur N75BA, Desmodur RFE, Desmodur RE supplied by Bayer Materials and Irodur E310 supplied by Huntsman. In this regard, the crosslinking agent used in Example 12 of FIG. 1 was a multifunctional isocyanate.

Another preferred embodiment includes blocked isocyanates with not less than 3 isocyanate functional groups, those groups reacting with the hydroxyl group of the polyurethane. When unblocked, mostly by elevated temperature, the isocyanate groups react with the hydroxyl group of the polyurethane. Crosslinking agents with blocked isocyanates can be produced by reacting the multifunctional isocyanates with different blocking agents. Each blocking agent has a different de-blocking temperature, the temperature at which the dissociation reaction occurs that separates the blocking agent from the blocked isocyanate and provide the isocyanate functional group available for reaction. Examples of blocking agents are the oxime agent such as 3,5-dimethyl pyrazol, 2,6-dimethyl-4-heptanone oxime, methyl ethyl ketoxime, 2-heptanone oxime; 1,24-triazole; ϵ-caprolactam; and the alcohols such as nonylphenol, t-butanol, propylene glycol, isopropanol, methanol, n-butanol, n-propanol, n-hexanol, n-pentanol.

Examples of crosslinking agents with blocked isocyanate groups include the polyether aromatic based polyurethane prepolymer Impranil product line supplied by Bayer Coating such as Impranil HS-62, Impranil HS-130 or the commercially available Duranate 17B-60PX, Duranate TPA-B80X, Duranate E402-B80T, Duranate MF-B60X manufactured by Asahi Kasei Chemicals Corporation.

Another preferred embodiment includes heat-activated urea compounds with not less than two urea functional groups, wherein the urea functional groups react with the hydroxyl groups of the polyurethane at high temperature through allophanate and biuret formation. Preferred embodiments of such heat-activated ureas include, but are not limited to, 3,3'-hexamethylenebis(1,1'-dipropylurea) and 3,3'-(4-methyl-1,3-phenylene)bis(1,1'-dipropylurea).

Another preferred embodiment includes (hydroxyalkyl) urea compounds with single urea group and 2 hydroxyl groups, where the groups react with the isoycanate group of the prepolymer. Preferred embodiments include, but are not limited to, N,N-bis(2-hydroxyethyl)urea, tetrakis(2-hydroxylethyl)urea, tris(2-hydroxyethyl)urea, N,N'-bis(2-hydroxyethyl)urea, N,N'-bis(3-hydroxyethyl)urea, N,N'-bis(4-hydroxybutyl)urea and 2-urea-2-ethyl-1,3-propanediol.

Transparent Resin Sheet

There are many materials that can be used to make transparent resin sheets so long as such a resin has a high transparency. When the photochromic polyurethane laminate of the present invention is used in a thermoplastic article such as a spectacle lens, the transparent resin sheets of the laminate are preferably comprised of a resin material that is thermally fusible to the article base material so that the photochromic laminate is tightly integrated with the article base when produced with the injection molding process. Thus, it is more preferred to have the same kind of material in both the article base and the transparent resin sheets.

Suitable sheet resin materials include polycarbonate, polysulfone, cellulose acetate buturate (CAB), polyacrylate, polyester, polystyrene, copolymer of acrylate and styrene.

A polycarbonate-base resin is particularly preferred because of its high transparency, high tenacity, high thermal resistance, high refractive index, and most importantly its compatibility with the article base material when polycarbonate photochromic lenses are produced with the photochromic polyurethane laminate of the present invention by the injection molding process.

A typical polycarbonate based resin is polybisphenol-A carbonate. In addition, examples of polycarbonate based resin include homopolycarbonate such as 1,1'-dihroxydiphenyl-phenylmethylmethane, 1,1'-dihroxydiphenyl-diphenylmethane, 1,1'-dihydroxy-3,3'-dimethyl diphenyl-2,2-propane, their mutual copolymer polycarbonate and copolymer polycarbonate with bisphenol-A.

One preferred embodiment of the transparent resin sheet for use in making a cast photochromic lens is Celluloase Acylate film because of its high transparency, high thermal resistance, and more important, its similar refractive index and its compatibility to CR39 resin when a CR39 photochromic lenses are produce with the photochromic polyurethane laminate of the present invention by the casting process.

Cellulose Acylate film (all or part of the hydroxyl groups at 2-, 3- and 6-positions of cellulose molecules are esterified with an acyl group). Acetyl group is a preferable substitution of the hydroxyl groups. Also, an acyl group with two or more carbon atoms, substituting the hydroxyl group of cellulose may be an aliphatic group or an aryl group. Examples can be an alkylcarbonyl ester, and alkenylcarbonyl ester, an aromatic carbonyl ester or an aromatic alkylcarbonyl ester of cellulose.

Examples of cellulose acylate resin sheets are cellulose diacetate, cellulose triacetate.

The foregoing embodiments are provided by way of example only. The scope of the invention is to be defined only by the scope of the following claims.

What is claimed is:

1. A photochromic polyurethane laminate comprising:
- a crosslinked photochromic polyurethane layer prepared from a composition comprising:
  - a polyurethane;
  - an isocyanate prepolymer;
  - a crosslinking agent comprising a heat-activated urea compound having two or more functional urea groups; and
  - a photochromic agent;
- a first resin layer attached to a first side of the crosslinked photochromic polyurethane layer; and
- a second resin layer attached to a second side of the crosslinked photochromic polyurethane layer.

2. The photochromic polyurethane laminate according to claim 1, wherein the polyurethane is formed from a polycaprolactone diol.

3. The photochromic polyurethane laminate according to claim 1, wherein the two or more functional urea groups of the heat-activated urea compound are connected by an aromatic ring.

4. The photochromic polyurethane laminate according to claim 1, wherein the two or more functional urea groups of the heat-activated urea compound are connected by an aliphatic chain.

5. A photochromic polyurethane laminate comprising:
- a first resin layer;
- a second resin layer; and
- a crosslinked photochromic polyurethane layer disposed between the first and the second resin layers, the crosslinked photochromic polyurethane layer formed of a composition comprising:
  - a polyurethane;
  - an isocyanate prepolymer;
  - a crosslinking agent comprising a heat-activated urea compound having at least two urea functional groups that react with hydroxyl groups of the polyurethane; and
- at least one photochromic compound.

6. The photochromic polyurethane laminate according to claim 5, wherein said at least two urea functional groups of said heat-activated urea compound react with hydroxyl groups of the polyurethane at an elevated temperature to form allophanate or biuret.

7. The photochromic polyurethane laminate according to claim 5, wherein said heat-activated urea compound comprises 3,3'-hexamethylenebis(1,1'-dipropylurea) or 3,3'-(4-methyl-1,3-phenylene)bis(1,1'-dipropylurea).

8. A photochromic polyurethane laminate comprising:

a first resin layer;

a second resin layer; and a crosslinked photochromic polyurethane layer disposed between the first resin layer and the second resin layer, the crosslinked photochromic polyurethane layer formed of a composition comprising:

a thermoplastic polyurethane prepared from a composition comprising an aliphatic diisocyanate, a diol and a chain extender;

an isocyanate prepolymer prepared from a composition comprising an aliphatic diisocyanate and a diol;

a crosslinking agent comprising a heat-activated urea compound; and at least one photochromic compound.

9. The photochromic polyurethane laminate according to claim 8, wherein the aliphatic diisocyanate is an alicyclic diisocyanate.

10. The photochromic polyurethane laminate according to claim 9, wherein the alicyclic diisocyanate comprises 4,4'-dicyclohexylmethanediisocyanate.

11. The photochromic polyurethane laminate according to claim 8, wherein the diol comprises a polycaprolactone diol having an OH number of 112 mg KOH/g and a number average molecular weight of about 1000 g/mole.

12. The photochromic polyurethane laminate according to claim 8, wherein the chain extender to prepare the thermoplastic polyurethane comprises 1,4-butane-diol.

13. The photochromic polyurethane laminate according to claim 8, wherein the crosslinking agent comprising the heat-activated urea compound further comprises at least two urea functional groups.

14. The photochromic polyurethane laminate according to claim 13, wherein the at least two urea functional groups of the heat-activated urea compound are connected by an aromatic ring.

15. The photochromic polyurethane laminate according to claim 13, wherein the at least two urea functional groups of the heat-activated urea compound are connected by an aliphatic chain.

16. The photochromic polyurethane laminate according to claim 13, wherein the at least two urea functional groups of the heat-activated urea compound are configured to react with hydroxyl groups of the thermoplastic polyurethane at an elevated temperature to form allophanate or biuret.

17. The photochromic polyurethane laminate according to claim 8, wherein the heat-activated urea compound comprises 3,3'-hexamethylenebis(1,1'-dipropylurea) or 3,3'-(4-methyl-1,3-phenylene)bis(1,1'-dipropylurea).

18. The photochromic polyurethane laminate according to claim 8, wherein the thermoplastic polyurethane comprises an average molecular weight in a range of 75,000 to 100,000.

19. The photochromic polyurethane laminate according to claim 8, wherein the isocyanate prepolymer comprises a weight molecular weight in a range of 5000 to 15,000.

* * * * *